UNITED STATES PATENT OFFICE.

LONNIE W. RYAN, OF CHICAGO, ILLINOIS, ASSIGNOR TO LINDSAY LIGHT COMPANY, OF CHICAGO, ILLINOIS, A CORPORATION OF ILLINOIS.

RECOVERY OF THORIUM.

1,407,441. Specification of Letters Patent. Patented Feb. 21, 1922.

No Drawing. Application filed July 1, 1918. Serial No. 242,755.

*To all whom it may concern:*

Be it known that I, LONNIE W. RYAN, a citizen of the United States, residing at Chicago, in the county of Cook and State of Illinois, have invented a new and useful Improvement in the Recovery of Thorium, of which the following is a specification.

My invention relates to improvements in the art of purifying thorium and will be fully understood from the following specification.

In my earlier application, Serial No. 237,328, filed May 29, 1918, I have described a method of separating thorium from an acid solution containing the same, together with rare earth metals and iron, by selectively precipitating the thorium as a metaphosphate, as, for example, by the use of an amount of sodium metaphosphate slightly in excess of that required for uniting with all of the thorium present in the solution.

I have now discovered that certain metaphosphates are peculiarly valuable for this purpose, since they appear to be incapable of precipitating the rare earth metals (except ceric cerium) from cold or hot acid solutions, regardless of the proportion of the precipitant employed. These particular metaphosphates, or salts of particular metaphosphoric acids, are therefore capable of being employed to effect an unusually sharp separation of thorium from its accompanying impurities. A sodium metaphosphate exhibiting these advantageous properties and suitable for use in the process of the present invention may be prepared from microcosmic salt ($(NH_4)HNaPO_4$), as follows:

The microcosmic salt is heated gently, care being taken to hold its temperature at approximately 400° C. (below red heat) and until volatilization of water and ammonia ceases and the fused mass becomes crystalline in appearance. This mass is now dissolved in water and the aqueous solution is preferably employed as the precipitant for the separation of the thorium, although the solid salt might be added directly.

A sodium metaphosphate having the same properties, at least in so far as the present invention is concerned, may likewise be prepared from dihydrogen sodium phosphate by the application of gentle heat in the same manner as above described until volatilization of water ceases. An aqueous solution of this sodium metaphosphate is used in the manner above described as a precipitant.

By overheating either the microcosmic salt or the dihydrogen sodium phosphate there is obtained a sodium metaphosphate of a different character and which is capable of precipitating the rare earth metals, in cold or hot solutions, requiring for its use in the separation of thorium more or less precise limitations of the quantity employed, as described in my earlier application referred to.

The metaphosphates prepared in accordance with the present invention are clearly distinguishable as metaphosphates by the common tests, for example, they coagulate egg albumen in the presence of dilute acetic acid.

As an example of a process according to my invention, the following may be given:

500 pounds of India monazite sand having a thorium content calculated as oxide of approximately 9 per cent is heated with about 750 pounds of sulphuric acid under constant stirring for from four to eight hours, the temperature of the mass being maintained at approximately 200° to 300° C. At the end of this period the sand should be completely attacked and converted into a soluble form. It is now introduced into 1000 gallons of cold water, and, in general, will not give a clear solution, some small proportion of the thorium and other metals precipitating apparently as orthophosphates. 65 to 80 pounds of the sodium metaphosphate, prepared as heretofore described by the gentle heating of microcosmic salt, or dihydrogen sodium phosphate, is now added. Substantially all of the thorium present in the solution precipitates as a metaphosphate, while the rare earths (except ceric cerium of which only a minute proportion is present in any case) and a large part of the iron present remain in solution. The mass is now filtered and the filter-cake after washing will contain the thorium content of the monazite sands in some form of metaphosphate and admixed with a very small percentage of impurities which may be removed by subsequent treatment. Such treatment may consist in extracting the thorium as a carbonate with a sodium carbonate solution, or by decomposing the thorium compound by caustic soda, thereby converting it directly into a hydroxide. The thorium metaphosphate precipitate obtained in accordance with the present invention is susceptible of any of the known treatments for further purification, since it behaves, in this respect, substantially like the thorium metaphosphate precipitates obtained from those different metaphosphates which are capable of precipitating the rare earth metals in cold solutions. This thorium metaphosphate precipitate is likewise soluble in an excess of the precipitant.

It will therefore be understood that while as set forth in my earlier application referred to soluble metaphosphates will, in general, selectively precipitate thorium from acid solutions carrying the same in admixture with the rare earth metals, there is a particular class of metaphosphates which is capable of effecting this separation of the thorium without regard to the proportion of the precipitant used (except that thorium is soluble in a large excess), these particular metaphosphates being incapable of precipitating the rare earth metals.

The sodium metaphosphate prepared from microcosmic salt in the manner herein described is referred to in Roscoe & Schorlemmer (edition 1911), page 665, and there classified as a trimetaphosphate, while the potassium salt, apparently corresponding to the sodium salt made by me from dihydrogen sodium phosphate is at the same place identified by Roscoe and Schorlemmer as a monometaphosphate, being further described as insoluble in water, a statement which I do not find to be borne out, at least with respect to the sodium salt.

While I have in the foregoing described in some detail one specific process according to my invention, it is to be understood that this is illustrative only and for the purpose of making the invention more clear and that the same is not limited to this precise process, except in so far as such limitations are included within the terms of the accompanying claims, in which it is my intention to claim all novelty inherent in the invention as broadly as is permissible, in view of the prior art.

What I claim is:

1. The method of separating thorium from an acid solution containing the same in admixture with rare earth metals and iron, which consists in adding to such solution a water soluble sodium metaphosphate of the character produced by the gentle heating of a phosphate containing sodium and hydrogen, substantially as described.

2. The method of recovering thorium from monazite sands, which consists in heating said sands with sulphuric acid to effect decomposition thereof, introducing the decomposed sand into water, and selectively precipitating the thorium content of the solution by a soluble metaphosphate of the character produced by the gentle heating of a phosphate containing sodium and hydrogen, substantially as described.

LONNIE W. RYAN.